United States Patent Office.

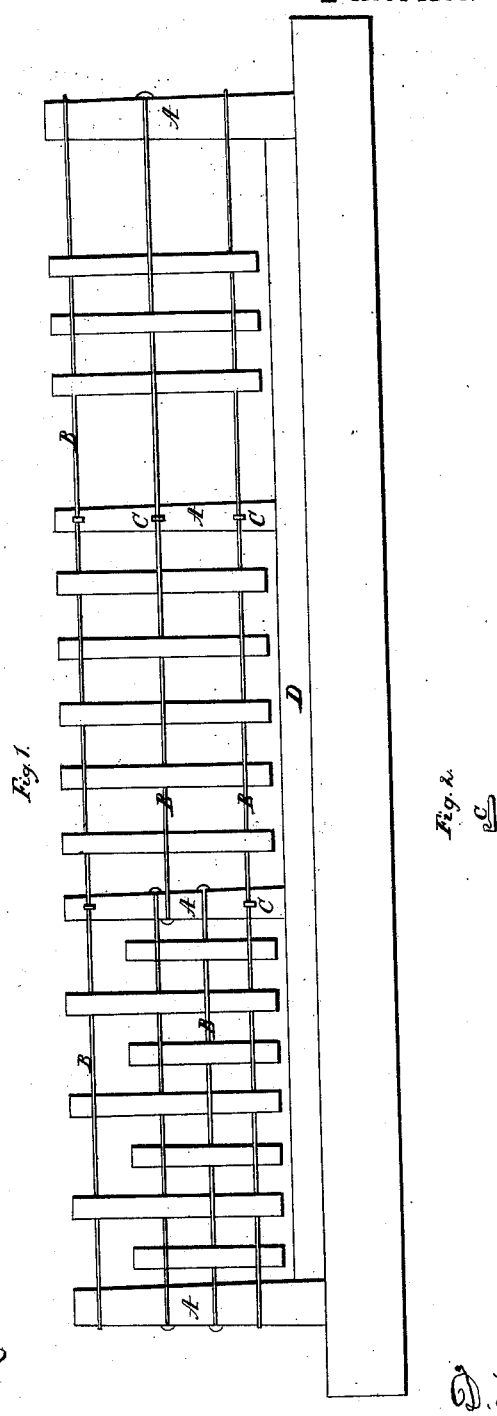

D. S. HUMPHREY, OF EAST TOWNSEND, OHIO.

Letters Patent No. 69,809, dated October 15, 1867.

IMPROVEMENT IN FARM-FENCE.

*The Schedule referred to in these Letters Patent and making part of the same.*

TO ALL WHOM IT MAY CONCERN:

Be it known that I, D. S. HUMPHREY, of East Townsend, in the county of Huron, and State of Ohio, have invented certain new and useful Improvements in Farm-Fences; and I do hereby declare that the following is full and complete description of the same, reference being had to the accompanying drawings, making a part of this specification, in which—

Figure 1 is a front view of the fence.
Figure 2 is a detached section.
Like letters of reference refer to like parts in the views.

A A are the fence-posts set in the ground in the usual way, the height and size of which being according to the strength and height of the fence required. Stretching from one post to the other are the wires B, the ends of which are attached to the end post in any such way as may be desirable, whereas the wires are attached to and supported by the intermediate posts by the hooked spikes or nails C, a detached view of which is shown in fig. 2, in which it will be seen that the nail is formed with a hook-like head, so that when it is driven into the post the hook will clasp around the wire and thereby hold it from becoming dislodged from the post. The wires, when first stretched upon the post, are not drawn taut, but are allowed to hang somewhat loosely, so that the slats or pickets D, when woven into the wires, as shown in the drawing, will not draw them so tight as to break them or prevent the introduction of the slats, which, of necessity, shortens up the wires by deflecting them from a right line by so much as the thickness of the picket, but at the same time draws the wires sufficiently taut to hold securely the inwoven slats, and thereby prevent them from slipping down or from any lateral displacement.

It will be observed that one section of the fence shown in the drawing is arranged with four wires, for the purpose of modifying the style of the fence, which, in this instance, consists of short and long pickets, thereby making the lower part of the fence closer than the upper, whereby smaller animals can be kept back. It will also be observed that the other section of the illustration shows but three wires, with long pickets of equal length, but not so close together. This arrangement is designed for larger animals, as horses, &c., both of which, however, embrace the same principle of supporting the pickets by the tension of the wires.

In the construction of this fence it is not proposed to plant the post nearer than some thirty feet, and thus allow one or more of the pickets to rest upon the ground, a stone or block being placed under it for that purpose. A ridge of earth, D, by back-furrowing, is thrown under the fence, and thus the ground is made higher and dry along the line of fencing.

A fence thus constructed is neat, durable, and comparatively inexpensive. It is easily kept in repair, and the posts, as they may rot down, can be easily replaced without taking down the fence, by simply drawing out the hooked spike confining the wire, set a new post, and secure the wire to the post as before.

The wires in fences as usually constructed are very liable to break, in consequence of the want of some compensating means to meet their contraction caused by the change of temperature. In this fence this defect is met by the wires themselves, which, not being made taut by being drawn straight, but taut by being curved by the picket, will straighten on contraction by springing the pickets, which, being made of thin stuff, readily yield to the strain exerted upon them, and thus allow the contracting wires to take up the slack. Each picket yielding a little, the whole contributes enough to meet the contraction of the entire range of wires, and therefore will not break.

I do not intend to confine myself to any particular distance in placing the posts. They may be more or less than thirty feet apart.

What I claim as my improvement, and desire to secure by Letters Patent, is—

1. The herein-described fence, when the wires employed in its construction are so arranged as to support the slats or pickets, in the manner substantially as set forth.

2. The arrangement of the wires B and pickets D in combination with the posts, constructed as and for the purpose set forth.

D. S. HUMPHREY.

Witnesses:
J. H. BURRIDGE,
J. HOLMES.